United States Patent [19]

Forbes

[11] Patent Number: 4,961,283
[45] Date of Patent: * Oct. 9, 1990

[54] EXTERMINATION OF INSECTS BY HEAT

[76] Inventor: Charles Forbes, 7343 Via Lorado, Rancho Palos Verdes, Calif. 90274

[ * ] Notice: The portion of the term of this patent subsequent to Apr. 4, 2006 has been disclaimed.

[21] Appl. No.: 309,319

[22] Filed: Feb. 10, 1989

Related U.S. Application Data

[63] Continuation of Ser. No. 902,317, Aug. 29, 1986.

[51] Int. Cl.⁵ .............................................. A01M 1/20
[52] U.S. Cl. ...................................... 43/124; 43/132.1
[58] Field of Search ...................... 43/124, 132.1, 144, 43/107, 130

[56] References Cited

U.S. PATENT DOCUMENTS

| | | | |
|---|---|---|---|
| 919,827 | 4/1909 | Cochrane | 43/144 |
| 1,021,530 | 3/1912 | Johnson | 47/37 |
| 1,817,535 | 8/1931 | Spanel | 206/278.1 |
| 2,469,963 | 5/1949 | Grosjean et al. | 43/124 |
| 3,124,893 | 3/1964 | Glenn | 43/124 |
| 3,782,026 | 1/1974 | Bridges et al. | 43/124 |
| 4,637,161 | 1/1987 | Turner | 43/130 |
| 4,640,044 | 2/1987 | Varnon | 43/144 |
| 4,817,329 | 4/1989 | Forbes | 43/124 |

OTHER PUBLICATIONS

"The Bedbug" Farmers's Bulletin, 754, U.S.D.A., C. L. Marlatt, issued 10-14-16, revised 1-1918.

*Primary Examiner*—Richard K. Seidel
*Assistant Examiner*—James Miner
*Attorney, Agent, or Firm*—Donald D. Mon

[57] ABSTRACT

A method to exterminate insects, urban environments, utilizing heat to kill the insects. Optimization of application of heat is shown. The intended environment hidden voids in urban structures.

5 Claims, 2 Drawing Sheets

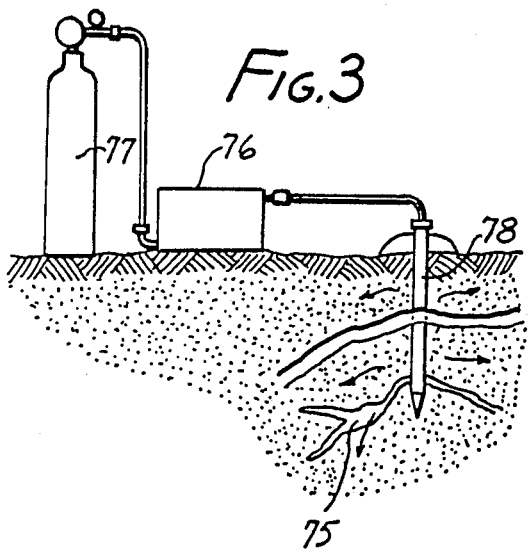
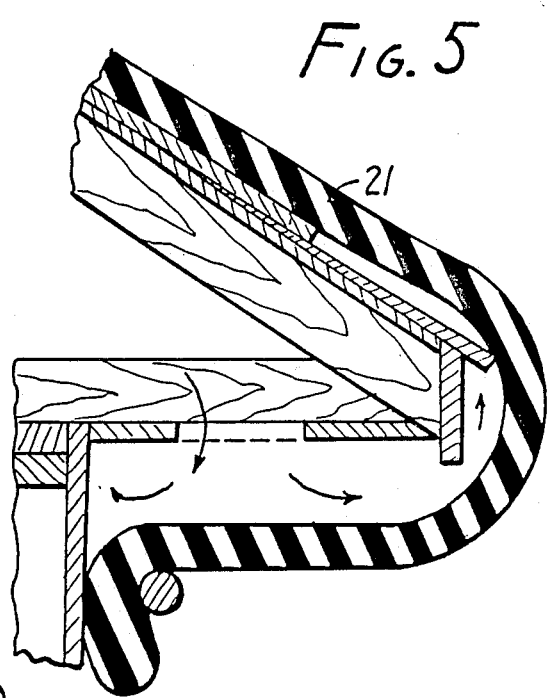
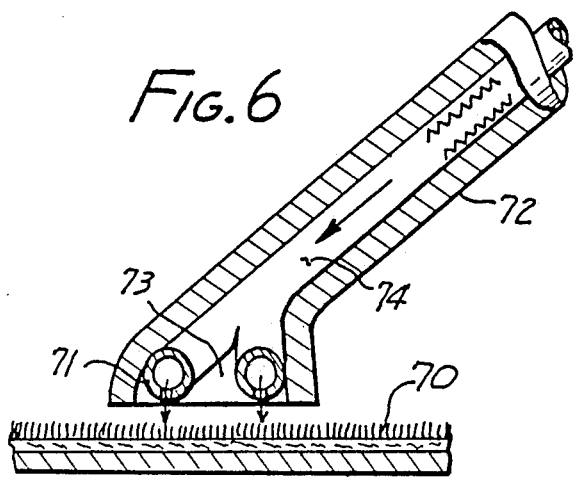
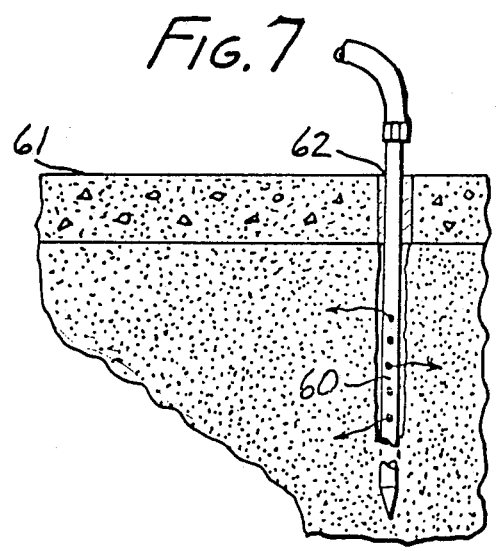
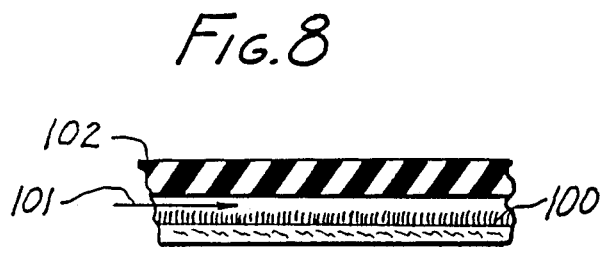
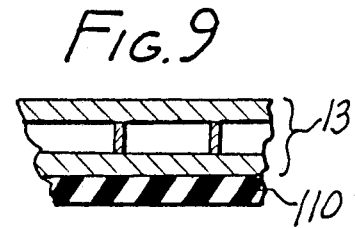

EXTERMINATION OF INSECTS BY HEAT

CROSS-REFERENCE TO OTHER APPLICATION

This is a continuation of applicant's presently co-pending U.S. patent application, Ser. No. 902,317, filed Aug. 29, 1986 entitled "Extermination of Insects By Heat".

FIELD OF THE INVENTION

This invention relates to extermination of insects in urban structures, for example termites in houses, by subjecting them to a suitably elevated temperature for a sufficient time to kill them but without harming the structures which they infest.

BACKGROUND OF THE INVENTION

This invention relates to extermination of insects by the use of heat. While it is applicable to a wide range of insect life, its most important application at the present time is in the extermination of termites in existing structures, and is an exercise in urban entymology.

All insect life, including termites, has a temperature range within which it can survive and thrive. TemperatureS appreciably outside of this range are lethal, and temperatures which are outside of the range but still close to it will be lethal if maintained for a long enough period of time. The causes of death vary from insect to insect, and also are frequently temperature dependent. Very high temperatures will melt or crack the wax layer carried by many insects, and then they dehydrate and die. At lesser but still pertinent temperatures there may be a different cause of death. The precise mechanism by which the insect perishes is of no particular interest to the invention, but the fact that the insect perishes is the very point, and that it is killed without harm to the structure or to people who utilize the structure.

The use of elevated temperatures to kill insects avoids the risks and inconveniences of using toxic gases in fumigation techniques. There is no need to use anything but atmospheric air or other friendly gases, so that clean up after the process is unnecessary. The equipment is conventional and is operable by persons of few skills. Preparation for use in an occupied structure involves no more than removal of temperature sensitive materials such as candles, and sometimes the placing of insulation matts.

This is a novel, effective, economical and safe means for exterminating insects.

BRIEF DESCRIPTION OF THE INVENTION

This invention is accomplished by heating a region infested by insects to a suitably elevated temperature for a time sufficient to kill the insect but without harming the structure. According to a preferred embodiment, a region to be treated is subjected to hot gases for period of time sufficient to raise the host material (the "region") temperature to the desired level, and to maintain it at that temperature for a suitable period of time. The "region" to be treated may of course be only indirectly approached by the gases themselves. For example, the inside of an infested post will not directly be contacted by the gases, but will be heated by heat conducted from a surface of the post, which is exposed to the convected air. The heated gases will then be continued in a volume such as a room or other enclosed space.

According to other useful but optional features of the invention, the hot gases may be an inert gas such as nitrogen, used with the intention of leaving a residual anoxic environment in the region after treatment. Another useful but optional feature of the invention is to utilize convection fans in the region in which the gases are provided to prevent thermal stratification that would reduce heat transfer and the thermal effects in parts of the strucure.

The above and other features of this invention will be fully understood from the following detailed description and the accompanying drawings, in which:

BRIEF DESCRIPTION OF THE DRAWINGS

FIG. 3 shows the invention being used to exterminate insect life in the ground;

FIG. 5 is a vignette showing an optional insulating system;

FIG. 6 shows the invention being used to kill insects such as fleas in a carpet;

FIG. 7 is a schematic showing of the invention being used to treat the ground beneath a concrete slab;

FIG. 8 is a schematic cross-section showing the invention being used to treat a rug beneath an insulting matt; and FIG. 9 is a fragmentary view of another feature of the invention.

DETAILED DESCRIPTION OF THE INVENTION

Figure 1:
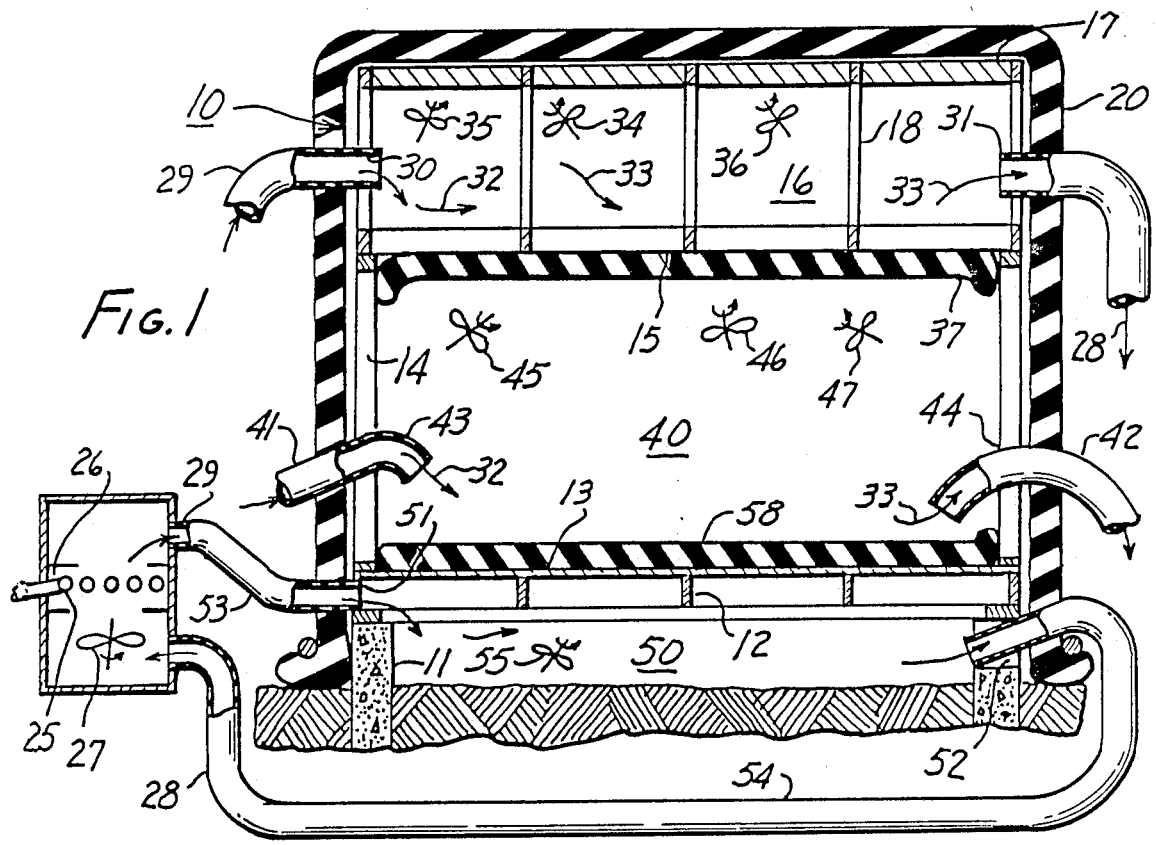
FIG. 1 is a schematic vertical cross-section of a house being treated according to the invention.

In FIG. 1 a house 10 is schematically shown having a foundation stem wall 11, joists 12, floor 13, and wall 14. A ceiling 15 is shown forming the top of the room and the bottom of an attic 16. The attic is surmounted by a roof 17. The roof shown is a conventional peaked structure supported by rafters 18 with a clear span from end to end. It is clear that this is by way of example only. The invention is applicable to all types of structures. Still another example is a building with block walls an a wooden roof.

The structure is shown encased in an insulation matt 20. The entire house is shown encased in the matt in FIG. 1. FIG. 5 shows only the upper portion of the house with an insulation matt 21 which extends over the roof and is curled just under the eaves. This is sufficient to provide insulation for the system in the event that only the attic is being treated.

Attic treatment is shown in the upper portion of FIG. 1. A burner 25 is schematically shown having a conventional heat exchanger 26 and a blower 27. It has an inlet hose 28 and an outlet hose 29. It will be unnecessary to bring fresh air into the system during its operation. It is most economical simply to recirculate air which is already in the attic and in the heating system. For this purpose, outlet hose 29 is led to an aperture 30 in the house, perhaps a window or a vent, and the inlet hose is led to another such aperture 31. Thus, hot gas flow occurs as indicated by arrows 32 and 33. In order to avoid temperature stratification and to insure uniform heating in the attic, a group of convection fans 354, 35, 36 is placed in the attic which blow in various directions to keep the air in motion. Accordingly, there will be a flow of hot air in the enclosed attic volume which will heat the inside of the attic and the regions to be treated. The regions to be treated, namely the structure which forms the attic, will gradually be heated by these gases. After the structure has been heated to a suitable temperature and maintained there for a suitable period of time, then the supply of hot air will be discontinued.

For optimum treatment in the attic, it usually will be found useful to provide an insulation matt 37 against the ceiling underneath the attic, which will prevent the formation of an equilibrium of temperature within the region to be treated. This will be used when only the attic is being treated, and it may not be necessary in every situation.

When a room 40 within the house is to be treated, then hoses 41 and 42 will be connected to apertures 43 and 44 in the wall, perhaps windows. Fans 45, 46, 47, will be placed as appropriate, an the process will be repeated.

Similarly, for work in the crawl space 50 under the floor or in a basement, apertures 51, 52 such as vents, will be connected to hose 53, 54. Fans 55 will be placed in the space, and the process carried out as before. In this case insulating matts 58 may be placed upon the rug or on the floor if necessary in order to resist the formation of a equilibrium temperture within the flooring.

Figure 2:
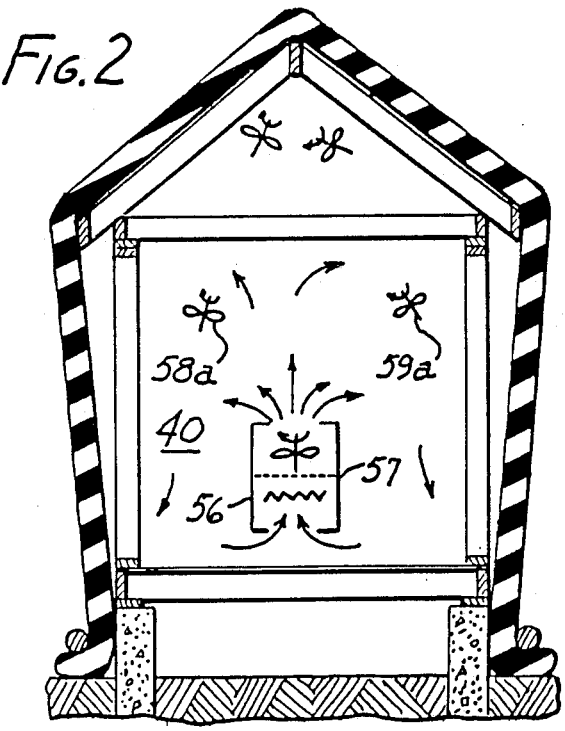
FIG. 2 is a schematic side view of FIG. 1.

FIG. 2 shows that a heater 56 which as an electric resistance heater, can be placed in the volume itself. It may be combined with a ducted fan 57 for circulation purposes as shown. Other fans 58a and 59a may be provided instead or in addition to fan 57 as preferred.

It will be noted that the heating effect will be much more effective on the floor than on the ground beneath it. It may be necessary to maintain the temperature for a longer period of time if treatment of the ground itself is to be made using this technique.

Treatment of ground infestation, for example, structural pest, is shown in FIG. 7. A nozzle 60 is shown inserted into the ground for localized treatment. This is effective when the earth beneath a concrete slab 61 is to be treated for termites. A hole 62 is drilled through the slab and the nozzle is inserted though it into the ground. Then the gases will be injected under pressure for a suitable period of time. Migration of the gases in the ground will be relied upon for flow.

Figure 4:
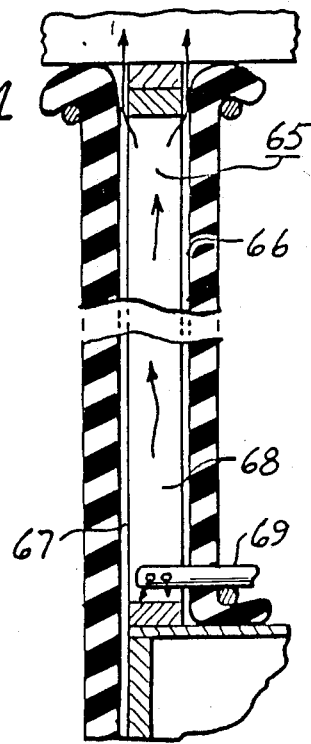
FIG. 4 shows the invention being used to treat the inside structure of a wall.

FIG. 4 shows the treatment of the inside of a wall 65 where there are two wall surfaces 66 and 67 separated by and stud 68. In this case there will be an inlet aperture 60 for the hot gases, and outlet flow will be accomplished simply by leakage through the wall.

FIG. 6 shows the use of heat to kill insects such as fleas in a carpet 70. A nozzle 71 mounted to a handle 72 has a chamber 73 which faces downward toward the carpet and there is an inlet hose 74 to provide hot air to it. The nozzle will be moved back and forth across the capet at a rate and for a period of time sufficient to raise the temperature enough to kill the fleas.

In FIG. 3 there is shown the subterranean treatment of a nest 75 of insects. Here a burner 76 is shown heating a gas such as nitrogen from a nitogen supply 77. Either a blower may be used or a regulator from a pressurized system if the nitrogen is under pressure. Hot nitrogen or any other gas under pressure injected into the ground through nozzle 78. The use of nitrogen has the advantage of driving out the oxygen and leaving an anoxic region behind, which itself will be lethal to further life for a residual period of time.

FIG. 8 shows a carpet 100 being treated by hot gases 101 injected beneath an insulating matt 102.

FIG. 9 shows a means for improving the efficiency of treating floor 13, and insulating matt 110 placed beneath it.

It will be recognized that the same source of hot gases shown in FIG. 1 can be used for all regions in the structure, and for generating hot gases for injection into the ground, and for use on surfaces such as floorings, rugs and capets. The various hoses shown in FIG. 1 can be connected in pairs, used as individual pairs, or all at once, as desired.

It is not necessary to recirculate the air. Sometimes it may be preferred to permit hot air to leak away, and simply supply heated air at a hotter temperature or greater volume. The requirements of the individual job will dictate the choice.

Also, it is to be recognized that it is the heat from the gases, rather than the gases themselves, which accomplish the kill. To illustrate this fact, an electrical resistance heater is shown set up in house 10. It can generate heat in the room, and the fans will circulate the heated air until the region reaches the intended temperature. Therefore the provision of recirculation for gas, or even of a stream of gas, is not a limitation on the generality of this invention.

Sufficiently elevated temperatures for most insect life is surprisingly low. However low these may seem numerically, in the actual environment they are only rarely reached. This is because there is usually some shade, or some current of cooling air that pervents it. Also, may buildings are air conditioned. As to this latter feature, it should be recongnized that the existing heating and cooling ducts in existing structures might advantageously be used to circulate the heated gases.

Experiments with drywood termites Incistermes Minor have shown that there are no survivors from even brief exposure to 120 degrees F., temperature. There may be some survivors at 115 degrees F, but the longer this temperature is maintained, the fewer survivors there are. At 135 degrees F., not only are there no survivors, but the insects appear to be dehydrated. Thus, 120 degrees is a sufficiently elevated temperature for a short exposure by this particular insect. A longer exposure is needed for lower tempertures, and finally there is a temperature at which no kill occurs, no matter how long the exposure. The temperatures may and do vary somewhat for various insects, and must be determined for individual species. However, the effective temperatures are suprisingly close.

The heating of structures, especially of wooden structures, takes time, and requires a thermal gradient. In order to complete the task in an economical period of time, the gas temperature must be significantly higher than the desired temperature.

An example of practical ranges and times, a 4×4 wooden post at about 75 degrees F., exposed convecting air at 160 degrees F. will heat the post to 120 degrees F. at its innermost point in about one hour. There is a "coasting" effect which can be utilized and allowed for, where, even if the hot gas is turned off, the temperature at the inside of the wood will continue to rise for a while. Thus, it would be possible to terminate the heating when the interior of the post is prehaps only 115 degrees F., and then to rely on the ensuring raise in temperature for the kill. Usually that will not be done, because the certainty of kill is worth a little more time and fuel.

It is acknowledged that lumber has long been exposed to high temperatures in kilns, and that heat treatment has been used on imported lumber and plywood to exclude foreign insects. However, this is an entirely different objective and this invention is an application of urban entymology, in which an environment constructed or occupied by man is to be made free from insects without adversely affecting man or structures. The almost exclusive reliance on toxic gases in fumigation procedures, or on poisonous baits and traps, are ample testimony to the fact that man has been willing to subject himself to risk in order to eradicate certain pests. With this invention, those risks are avoided. The costs of utilizing these procedures are minor and no substances deleterious to man are left behind in the structures. This invention thereby provides a stage and non-polluting technique to rid urban environments of insect life.

This invention is not to be limited by the embodiments shown in the drawings and described in the description, which are given by way of example and not of limitation, but only in accordance with the scope of the appended claims.

I claim:

1. A method of killing space occupying insects which are in occupancy in hidden void spaces, which void spaces are formed by a plurality of structural elements, said elements having a void space facing surface, and at least one of said elements having a living space facing surface, and said elements having dimensions of thickness and length so as to form structure around said void spaces, said insects having the inherent characteristic of susceptibility to a lethal temperature which if maintained for a necessary period of time causes the death of said insects, said method comprising:

heating said hidden void space to said lethal temperature by the application of heated gas, and maintaining said lethal temperarure for said period of time by heating said living space facing surface and thereby heating its respective structural element to heat its respective void space facing surface, and thereby heating said hidden void space to exterminate the insects therein;

circulating said heated gas.

2. A method according to claim 1 in which said living space facing surface faces into a region accessible to a person, and in which the gases in said region are heated to apply heat to said living space facing surface.

3. A method according to claim 2 in which said gases at said living face facing surface are maintained turbulent.

4. A method according to claim 2 in which said region is a room, an attic, a space contiguous to an external surface, a ceiling, or a floor.

5. A method according to claim 1 in which at least two of said elements are spaced apart by at least two others of said elements whereby to bound a said hidden void space.

* * * * *